July 7, 1931.　　　　F. BURDICK　　　　1,813,275

FISHING REEL

Filed March 24, 1930

INVENTOR
Frank Burdick
BY Chappell Earl
ATTORNEYS

Patented July 7, 1931

1,813,275

UNITED STATES PATENT OFFICE

FRANK BURDICK, OF KALAMAZOO, MICHIGAN, ASSIGNOR TO SHAKESPEARE COMPANY, OF KALAMAZOO, MICHIGAN

FISHING REEL

Application filed March 24, 1930. Serial No. 438,309.

The main objects of this invention are:

First, to provide in a fishing reel an improved brake means which is efficient and at the same time compact and simple in structure.

Second, to provide in a fishing reel an improved brake means which may be readily adjusted to vary the braking action.

Third, to provide an improved brake means which is automatically released on the rotation of the reel in winding direction.

Objects relating to details and economies of construction and operation of my invention will appear from the description to follow. The invention is defined and pointed out in the claims.

A structure which is a preferred embodiment of my invention is illustrated in the accompanying drawings, in which.

Figure 1:
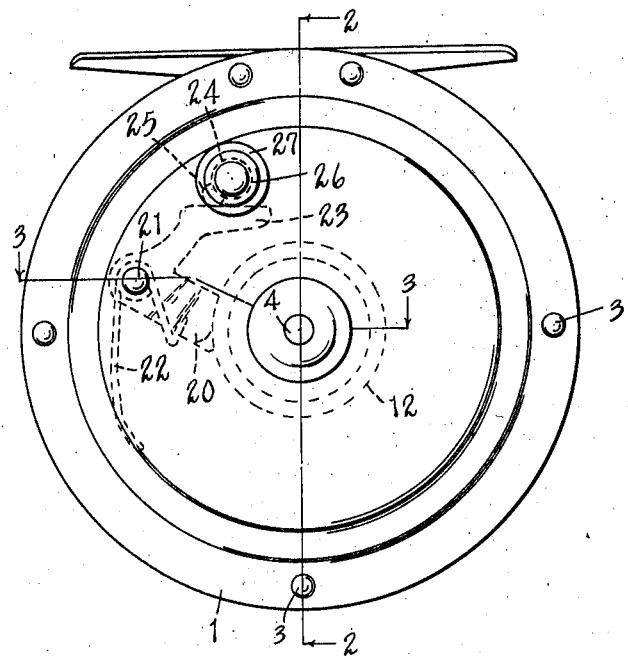
Fig. 1 is a side elevation of my improved reel.

Referring to the drawings, the frame comprises a chambered end member 1, and an annular end member 2 connected by pillars 3. The spindle 4 is mounted on the end member 1 and provided with a bushing 5, the spindle and its bushing in effect constituting the spindle. The bushing 5 is threaded at 6 to receive the nut 7.

The spool in the embodiment illustrated comprises the hub 8 having flanges 9 mounted thereon and supported in spaced relation by the barrel 10. The spool is rotatable on the spindle and is provided with a finger piece 11 secured to the flange at the open end of the frame.

The brake drum 12 having a V-shaped periphery 13 is rotatably mounted on the spindle. This brake drum has a friction disk 14 secured on the inner side thereof provided with a facing 15 coacting with the adjacent flange of the reel.

A spring thrust or friction member 16 is mounted on the spindle at the inside of the nut 7, this friction member having a lug 17 engaging the groove or recess 18 in the spindle, thereby supporting the friction member against rotation. This friction member has a facing 19 coacting with the other flange of the spool. By adjusting the nut, the amount of driving friction between the brake drum and the spool is regulated or varied.

Figures 2, 3:
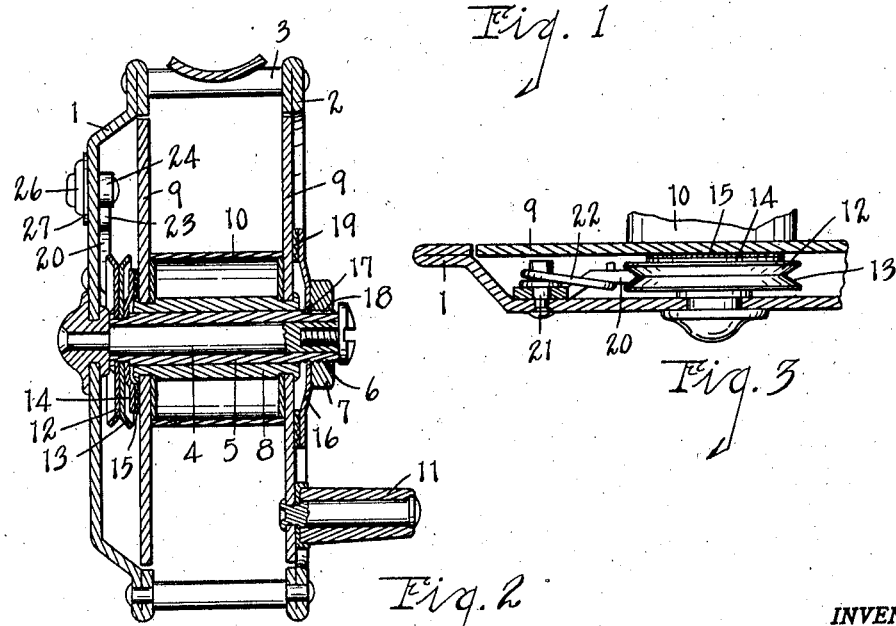
Fig. 2 is a detail view mainly in section on line 2—2 of Fig. 1.
Fig. 3 is a fragmentary view partially in section on line 3—3 of Fig. 1.

The brake shoe 20 is pivotally mounted at 21 to coact with the periphery of the brake drum, the face of this brake shoe being V-shaped, as shown in Fig. 3, to coact with the V-shaped periphery of the brake drum.

The pivot 21 of the brake is so positioned relative to the axis of the spool that rotation of the spool clockwise, considering the parts shown in Fig. 1 which is the unwinding rotation of the spool, serves to more firmly engage the brake owing to the frictional action of the brake with the brake drum. A spring 22 is, however, provided, one arm of this spring engaging the casing and the other the brake shoe so that the spring acts to urge the brake shoe to engaging position.

The brake is provided with an arm 23 which projects laterally from the pivot 21 and disposed to be engaged by the manually operated releasing member 24, this member being mounted in a slot 25 in the end member 1 of the frame and having a portion 26 projecting into the frame to coact with the end of the arm 23. This adjusting member has a friction member 27 coacting with the end member of the frame for holding the adjusting member in its adjusted positions.

With the parts thus arranged, the manually operated control means may be readily adjusted for releasing the brake and holding it in inoperative position. As soon, however, as this member is adjusted to the position shown in Fig. 1, the spring 22 acts to throw the brake into operative position, thereby locking or holding the drum against rotation so that the spool can rotate only under the action of the friction connection for the drum to the spool and this, as stated, may be varied as desired.

I have shown my improvements in one very practical embodiment thereof. I have not attempted to illustrate or describe other adaptations or embodiments thereof as it is believed that this disclosure will enable those skilled in the art to which my invention relates to embody or adapt the same as may be desired.

Having thus described my invention, what I claim as new and desire to secure by Letters Patent, is:

1. In a fishing reel, the combination with a frame, of a spool spindle mounted in said frame, a spool provided with flanges mounted on said spindle, a drum rotatably mounted on said spindle at one end of said spool, a spring friction disk on said brake drum coacting with one of the flanges of said spool, a spring friction disk non-rotatably mounted on said spindle to coact with the other spool flange, a brake shoe pivotally mounted on said frame to coact with the periphery of said brake drum, a spring acting to urge said brake shoe into engagement with said brake drum, said brake shoe being mounted relative to the axis of the brake drum so that rotation of the brake drum in one direction tends to engage said brake, and a manually operated means for holding said brake shoe in inoperative position.

2. In a fishing reel, the combination with a frame, of a spool spindle mounted in said frame, a spool rotatable on said spindle, a drum rotatably mounted on said spindle at one end of said spool, a friction member on said brake drum coacting with said spool, a brake shoe pivotally mounted on said frame to coact with the periphery of said brake drum, a spring acting to urge said brake shoe into engagement with said brake drum, said brake shoe being mounted relative to the axis of the brake drum so that rotation of the brake drum in one direction tends to engage said brake, and a manually operated means for holding said brake shoe in inoperative position.

3. In a fishing reel, the combination with a frame, of a spool spindle mounted in said frame, a spool rotatable on said spindle, a drum rotatably mounted on said spindle at one end of said spool, a friction member on said brake drum coacting with said spool, a brake shoe pivotally mounted on said frame to coact with the periphery of said brake drum, a spring acting to urge said brake shoe into engagement with said brake drum, and means for holding said brake shoe in inoperative position.

4. In a fishing reel, the combination with a frame, of a spool, a brake drum having a friction driving connection to said spool, said brake drum having a V-shaped periphery, a brake shoe having a face of V-cross section pivotally mounted on said frame to coact with the periphery of said brake drum, a spring acting to urge said brake shoe into engagement with said brake drum, said brake shoe being mounted relative to the axis of the brake drum so that rotation of the brake drum in one direction tends to engage said brake, and a manually operated means for holding said brake shoe in inoperative position.

5. In a fishing reel, the combination with a frame, of a spool, a brake drum having a friction driving connection to said spool, a brake shoe having a face of V-cross section pivotally mounted on said frame to coact with the periphery of said brake drum, a spring acting to urge said brake shoe into engagement with said brake drum, said brake shoe being mounted relative to the axis of the brake drum so that rotation of the brake drum in one direction tends to engage said brake, and a manually operated means for holding said brake shoe in inoperative position.

6. In a fishing reel, the combination with a frame, of a spool, a brake drum having a friction driving connection to said spool, said brake drum having a V-shaped periphery, a brake shoe having a face of V-cross section pivotally mounted on said frame to coact with the periphery of said brake drum, a spring acting to urge said brake shoe into engagement with said brake drum, and a manually operated means for holding said brake shoe in inoperative position.

7. In a fishing reel, the combination with a frame, of a spool, a brake drum having a friction driving connection to said spool, means for varying the friction of said driving connection, a brake shoe pivotally mounted on said frame to coact with the periphery of said brake drum, said brake shoe being mounted relative to the axis of the brake drum so that rotation of the brake drum in one direction tends to engage said brake, and manually operated means for holding said brake shoe in inoperative position.

8. In a fishing reel, the combination of a frame, a spool, a brake drum having frictional driving connection to said spool, a brake shoe pivotally mounted to coact with the periphery of said brake drum and so that rotation of the drum in one direction tends to engage said brake, and means for holding said brake shoe in inoperative position.

9. In a fishing reel the combination of a frame, a spool, a brake drum having frictional driving connection to said spool, and a brake shoe pivotally mounted to cooperate with the periphery of said brake drum so that rotation of the drum in one direction tends to engage the brake.

In witness whereof I have hereunto set my hand.

FRANK BURDICK.